United States Patent [19]

Flachsmann

[11] Patent Number: 4,609,201
[45] Date of Patent: Sep. 2, 1986

[54] SLIDING-VEHICLE, PARTICULARLY FOR SLIDING ON SNOW AND ICE

[76] Inventor: Jean-Paul Flachsmann, Am Schill, Oberwil, Switzerland, CH-6317

[21] Appl. No.: 591,245
[22] PCT Filed: Jul. 21, 1980
[86] PCT No.: PCT/CH80/00088
    § 371 Date: May 1, 1981
    § 102(e) Date: May 1, 1981
[87] PCT Pub. No.: WO81/00698
    PCT Pub. Date: Mar. 19, 1981

Related U.S. Application Data

[63] Continuation of Ser. No. 261,214, May 1, 1981, abandoned.

[30] Foreign Application Priority Data

Sep. 11, 1979 [CH] Switzerland .......................... 8230/79

[51] Int. Cl.⁴ .............................................. B62B 13/16
[52] U.S. Cl. ...................................................... 280/20
[58] Field of Search ................... 280/20, 19, 18, 12 B, 280/12 R, 28, 610; 441/74

[56] References Cited

U.S. PATENT DOCUMENTS

| 3,208,761 | 9/1965 | Sullivan | 280/610 |
| 3,414,284 | 12/1968 | Rosekrans | 280/18 |
| 3,884,490 | 5/1975 | Hellman | 280/18 |
| 4,170,367 | 10/1979 | Rickenbucher | 280/20 |
| 4,209,867 | 7/1980 | Abrams | 441/74 |

FOREIGN PATENT DOCUMENTS

| 262072 | 5/1968 | Austria | 280/18 |
| 10953 | of 1912 | United Kingdom | 280/20 |

Primary Examiner—John J. Love
Assistant Examiner—Joseph G. McCarthy
Attorney, Agent, or Firm—Darby & Darby

[57] ABSTRACT

A vehicle for sliding on the ice or snow having a bottom section for contact with the ice or snow, and a seat portion, the bottom being foldable and a handle provided on each section for use during riding and carrying.

11 Claims, 6 Drawing Figures

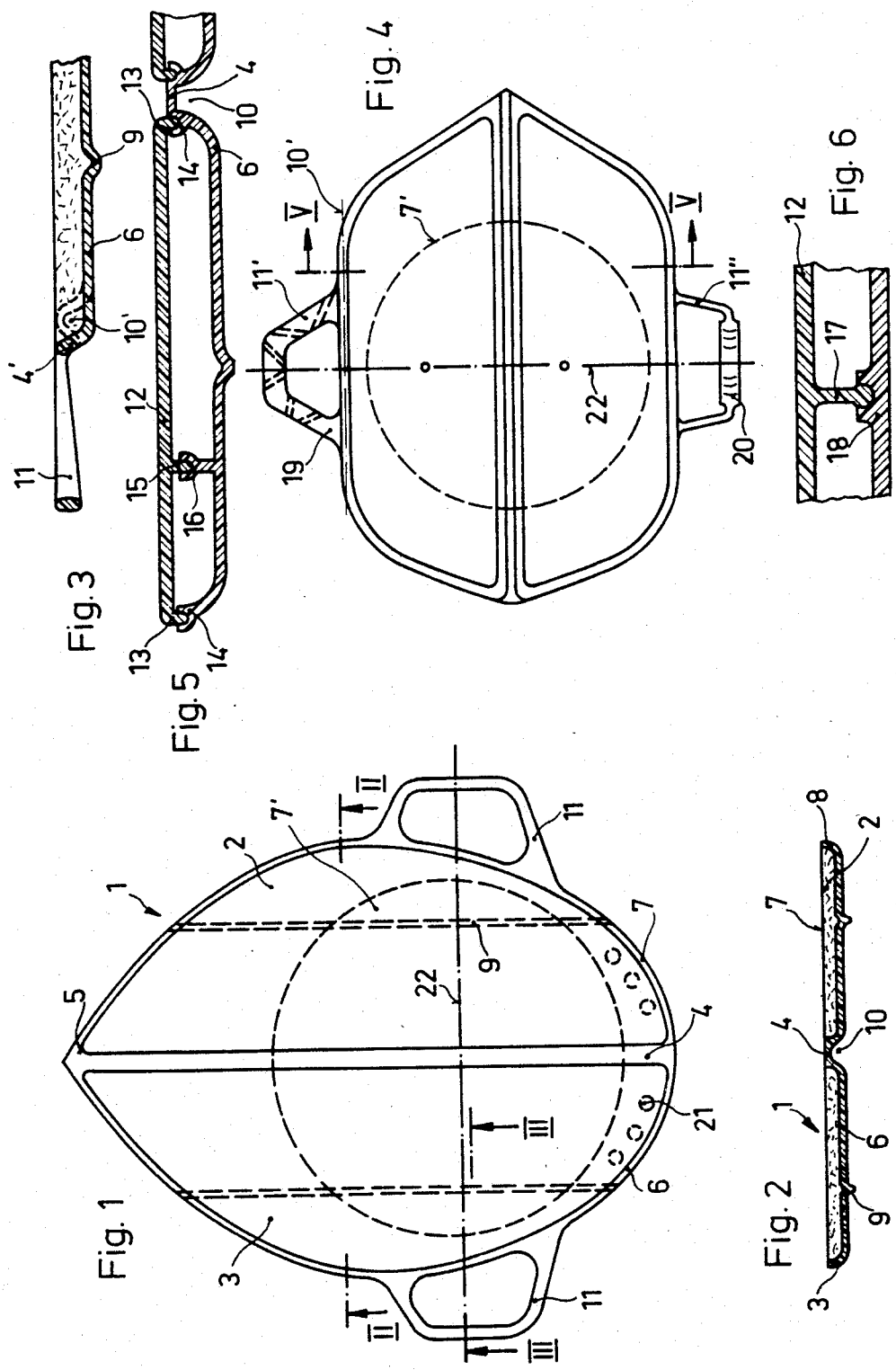

SLIDING-VEHICLE, PARTICULARLY FOR SLIDING ON SNOW AND ICE

This is a continuation of application Ser. No. 261,214, filed May 1, 1981, now abandoned.

The invention concerns a sliding vehicle, particularly for sliding on snow and ice, with a bottom surface having sliding surface and a seat for at least one person.

Sliding vehicles that can be used on snow and ice are known in various forms. In addition to the sliding vehicles which have been known for a long time and which are designed as sleds with a fixed sled frame, many forms of sliding vehicles are known which are made particularly of plastic. In a simple known embodiment, the sliding vehicle is substantially a thin, double-layered mat with a thin layer of upholstery material in between. At the front is arranged a handle with which the driver lifts the front part of the mat to permit sliding. This known embodiment fulfills the driver's wish for a light-weight, non-voluminous sliding vehicle, but it has the disadvantage that bulge of the mat formed by lifting the front handle has a braking effect, particlarly on soft snow since snow piles up there.

The object of the invention is therefore to design a sliding vehicle of the above-mentioned type which, while maintaining the advantage of a light-weight and space-saving design, has good sliding properties in all snow conditions and which is easy to steer.

This problem is solved according to the invention by structuring the sled such that the bottom surface is a rigid shield with at least two shield sections, which are joined with each other by a film hinge joint extending in the longitudinal axis of the sliding vehicle. The film hinge joint extending in the longitudinal axis of the sliding vehicle. permits in a simple manner changes of direction during sliding. At the same time the film hinge joint permits folding of the shield so that the sliding vehicle, despite its rigid shield, can be reduced to small dimensions for easy transportation.

According to the invention, the sliding vehicle can further be used as a coat hanger.

The invention is represented in the drawing various embodiments and will be described below.

FIG. 1 shows a top view of a sliding vehicle according to the invention.

FIG. 2 shows a section of the sliding vehicle according to FIG. 1 along line II—II in FIG. 1.

FIG. 3 shows on an enlarged scale a partial section of the sliding vehicle according to FIG. 1 along line III—III in FIG. 1.

FIG. 4 shows a top view of another embodiment of the sliding vehicle according to the invention.

FIG. 5 shows on an enlarged scale a partial section of the sliding vehicle according to FIG. 4 along line V—V in FIG. 4 and FIG. 6 shows a variant of a detail of the sliding vehicle according to FIG. 4.

The sliding vehicle shown in FIG. 1 has a bottom surface 1 in the form of a shield. Bottom surface 1 has two shield sections 2,3 which are joined with each other by a film hinge joint 4, as can be seen from FIG. 2. It is important that the film hinge joint extends in a direction parallel to longtudinal axis 5 of bottom surface 1. The embodiment according to FIGS. 1–3 shows a single film hinge joint 4, but bottom surface 1 could also be provided with several parallel piano hinges 4. Corresponding to the greater number of film hinge joints 4, the number of shield sections 2, 3 would also have to be increased correspondingly.

As can be seen from FIG. 2, bottom surface 1 has a sliding surface 6 and a seat 7. Sliding surface 6 is preferably designed as a rigid thin-walled hollow shell, preferably of plastic, e.g. polyethylene. Hollow shell 6 forming a flat shell has a curved outer edge 8 and in each shield sections 2,3 a skid 9, but more than one skid 9 can be arranged in each shield section 2,3. Film hinge joint 4 is preferably located in the area of seat 7, so that it closes a groove 10 formed between shield sections 2,3. Groove 10 has a form widening toward sliding surface 6, as can be seen from FIG. 2. If the transition of the two lateral surfaces of groove 10 into sliding surface 6 proper is sharply edged, this has an additional guiding effect. Seat 7 is preferably made of a soft material, particularly of a plastic foam, such as polyethylene foam, where the material fills preferably the entire cavity of sliding surface 6.

As can be seen from FIG. 1, handles 11 are arranged on both sides, for the driver to hold on and which he can use to change directions. Changes in direction are induced by shifting the center of gravity of the driver to take the load off one of the shield sections 2,3, e.g. a change of direction is started by taking the load off of the right shield section 2 by putting a corresponding load on the left shield section 3, and a change in the opposite direction is started by taking the load off shield section 3. A change of direction may also be accomplished by pulling the corresponding handle and pressing the foot into the snow.

FIG. 3 shows the area around handle 11 on an enlarged scale. Handles 11 are made of the same material as sliding surface 6. In FIG. 3, handles (11) are rigidly connected with sliding surface 6. But it is also possible, as indicated by the broken line, to connect handle 11 by means of a film hinge joint 4', preferably by forming a longitudinal groove 10', with sliding surface 6. In this case it is advisable to select the shield form according to FIG. 4, instead of that according to FIG. 1. The location of longitudinal groove 10' is indicated by a dot-dashed line.

The sliding vehicle shown in FIGS. 4 and 5 has likewise a hard sliding surface 6 of a similar form as in FIG. 1. Between the two shield sections 2,3 is arranged a film hinge joint 4 forming groove 10. Seat 12 differs from seat 7 in the embodiment of FIGS. 1–3; seat 12 is designed as a rigid cover at the rims of which are provided studs 13 which engage or snap into grooves 14 at the rim of sliding surface 6. Form-locking in this connection means that sliding surface 6 can not shift relative to seat 12, which is achieved, e.g. by providing cross bars in marginal grooves 14.

If an even greater stability of sliding surface 6 and seat 12 is desired, additional snaps can be arranged between sliding surface 6 and seat 12. As can be seen from FIG. 5, these can be straps 15, 16 which can be arranged at random. Instead of straps 15, 16 support can also be provided in the form of columns 17 arranged on seat 12 between sliding surface 6 and seat 12, (see FIG. 6,) which fit form-locking into a socket 18 of sliding surface 6. These supports 17, 18 prevent shifting of surface 6 relative to seat 12.

FIG. 4 shows two different types of handles 11', 11". Handle 11' is designed as a hollow body with ribs 19, while handle 11" has a solid body 20.

Sliding surfaces 6 structed as hollow shells, which have been used in the embodiment according to FIGS.

1 and 5, already impart sufficient stability to the shield sections. But if the elastic deformation from the weight of the driver is too great, the necessary stability can be achieved by incorporating therein straps 15, 16 or supports 17, 18. The degree of stability is correct if groove 10 formed by film hinge joint 4 ensures reliable guidance in snow and ice avoding digging-in of the front part of bottom surface 1 in deep snow because of excessive rigidity, on the one hand and avoiding the formation of a snow pile at the front end because of too little rigidity on the other hand.

In the embodiment according to FIG. 5, which likewise shows a rigid and therefore relatively stable embodiment, shield sections 2,3 form a closed hollow body which consists of two sections to FIG. 5. The hollow space formed by the two sections is not filled in. It is also possible to construct the two shield sections as a single hollow body, but preferably more than two shield sections are provided which are connected by corresponding film hinge joints 4. This way a shield-shaped sliding vehicle is formed which has several hollow bodies extending in in the direction parallel to the longitudinal axis 5, which are connected with each other by film hinge joints 4. The properties of such a sliding vehicle are the same as in a vehicle according to FIGS. 4 and 5. The stability of such a vehicle is likewise as great as in a vehicle according to FIGS. 4 and 5.

In FIGS. 1 and 4, seat area 7', occupied by the driver is represented by a broken line. Seat area 7' could also be defined by shapings, e.g. by a flat depression. It is also possible to mark seat area 7' without special shaping, e.g. by a different color. It is furthermore possible to omit the marking so that the driver can find for himself the best suitable seat area 7'. It is advisable to have connection line 22 running through the center of handles 11, 11', 11" and through the center of seat area 7'. It can also be seen from FIG. 4 that not only connection line 22 of the handle center runs through the center of seat area 7', but the center of seat 7 in turn lies in the region of the center of bottom surface 1. Arrangement of seat area 7 in the above-described manner relative to the center region of bottom surface 1 has the effect that the lever action exerted on the handles to change direction is optimized and the maneuverability of the sliding vehicles is improved by achieiving a uniform pressure on the ground.

As shown in FIG. 1 sliding surface 7 may additionally include drain holes 21 which permit the drainage of melted snow from the slid. Snow which accumulates in the slider seat, melts and causes the clothing of the user to become wet. Drainage holes 21 prevent the accumulation of large quantities of water in the slider seat and help prevent the rider's clothes from becoming wet from accumulated water.

The above-described sliding vehicle is particularly intended for sliding on snow and ice, but it can also be used on sand dunes and other appropriately prepared slopes.

I claim:

1. A sliding vehicle, particularly a sled for sliding on ice and snow, having a longitudinally axis extending in the direction of sliding, comprising:
    a bottom surface formed from two rigid shield sections conjointly defining a sliding surface;
    seating means for a rider including a center and a transverse axis running through said center, arranged on said bottom surface so that said transverse axis is approximately perpendicular to said longitudinal axis;
    at least one film hinge joint connecting said two shields, extending in a direction parallel to said longitudinal axis of said sled, said two shields being foldable thereabout;
    handles substantially disposed across said transverse axis of said seating means at outside sides of said seating means; and
    said two shields sections structured to mutually form at least one v-shaped groove for guiding said sled, said v-shaped groove extending in a direction parallel to said longitudinal axis of said sled, said v-shaped groove opening outward and diverging toward said sliding surface, and said film hinge joint forming the apex of said v-shaped groove.

2. The sliding vehicle according to claim 1 wherein the outer edge of said sliding surface is curved upward.

3. The sliding vehicle according to claim 1 wherein said shield sections further comprise at least one hollow shell forming said sliding surface of the bottom surface and said seating means is arranged on said at least one hollow shell.

4. The sliding vehicle in accordance with claim 1 wherein said bottom surface has a center and said seating means center is disposed substantially in alignment with said center of said bottom surface.

5. The sliding vehicle according to claim 4 wherein said shield comprises a hollow body having two shell parts having rims, said shell parts being coupled to each other at said shell rims to form-locking snap joints.

6. The sliding vehicle according to claim 5, wherein: said shell parts have columns which can be connected with each other in form-locking relation.

7. The sliding vehicle according to claim 5 wherein said shell parts have supporting ribs or columns which are form-locking with each other.

8. The sliding vehicle according to claim 1 wherein the handles are articulated with the bottom surface by a film hinge joint.

9. The sliding vehicle according to claim 1 wherein at lease one skid is arranged on the sliding surfaces of each shield section parallel to the film hinge joint.

10. The sliding vehicle according to claim 1 wherein openings for melted snow are provided in the sliding surface.

11. Sliding vehicle according to claim 1 wherein the shield (2, 3) is designed as a hollow body.

* * * * *